United States Patent
Diehl et al.

[11] Patent Number: 6,091,432
[45] Date of Patent: Jul. 18, 2000

[54] METHOD AND APPARATUS FOR IMPROVED BLOCK TRANSFERS IN COMPUTER GRAPHICS FRAME BUFFERS

[75] Inventors: Michael R. Diehl, Loveland; Joel D. Buck-Gengler, Longmont, both of Colo.

[73] Assignee: Hewlett-Packard Company, Palo Alto, Calif.

[21] Appl. No.: 09/052,866

[22] Filed: Mar. 31, 1998

[51] Int. Cl.$^7$ .................................................. G06F 13/00
[52] U.S. Cl. .......................................... 345/525; 345/509
[58] Field of Search .................................. 345/523–525, 345/509, 515–517, 508

[56] References Cited

U.S. PATENT DOCUMENTS

| | | | |
|---|---|---|---|
| 4,599,656 | 7/1986 | Bellinghausen | 358/261.3 |
| 5,754,750 | 5/1998 | Butterfield et al. | 345/418 |
| 5,929,872 | 7/1999 | Greene | 345/524 |

*Primary Examiner*—Kee M. Tung
*Attorney, Agent, or Firm*—Kevin M. Hart

[57] ABSTRACT

A method and apparatus for transferring a block of pixel data from a source multi-line frame buffer area to a destination multi-line frame buffer area in a raster-type computer graphics display system. The method steps are performed by a state machine embedded in a macro function unit within a computer graphics subsystem: It is first determined whether the first raster line corresponding to the destination multi-line frame buffer area is at least a minimum number of raster lines ahead of the current raster line. If so, the state machine follows a fast path, during which the pixel data are transferred one line at a time from the source multi-line frame buffer area to the destination multi-line frame buffer area until the last line of pixel data in the block has been transferred. Then, the transfer operation stops. If not, then the state machine follows a slow path. In the slow path, the state machine times the line-by-line transfers of pixel data so as intentionally to remain behind the raster throughout the transfer operation: The state machine checks before each line is transferred to make certain that the destination line is behind the raster. But after each line is written, the state machine also checks to see whether the next destination line is ahead of the raster; this may occur if a vertical retrace has just begun. If so, the slow path procedure is interrupted, and the state machine switches to the fast path for the remainder of the transfer operation.

5 Claims, 3 Drawing Sheets

METHOD AND APPARATUS FOR IMPROVED BLOCK TRANSFERS IN COMPUTER GRAPHICS FRAME BUFFERS

FIELD OF THE INVENTION

This invention relates generally to computer graphics display systems. More particularly, the invention relates to methods and apparatus for performing block transfers of data in or between frame buffers in computer graphics display systems.

BACKGROUND

In raster-type computer graphics display systems, a frame buffer memory is used to store pixel data. Typically, the frame buffer memory is arranged as an array, and the entry at a particular row and column in the array represents the intensity value of a corresponding pixel on the display device. (In the case of RGB display systems, each entry in the frame buffer includes intensity information corresponding to each of the R,G and B components of a pixel.) In operation, the pixel intensity values stored in the frame buffer memory are read in a repeating raster pattern and sent to a digital-to-analog converter module that drives the display device.

The display device also employs a repeating raster pattern to refresh the pixels that constitute the display. For example, in a CRT display device, horizontal and vertical deflectors are used to scan an electron beam in a left-to-right, top-to-bottom raster pattern that results in a brief periodic excitation for each pixel. After the beam has reached the right-most pixel in a given row of pixels, the beam quickly retraces to the left-most pixel in the next row. During this horizontal retrace movement, the intensity of the beam is reduced or "blanked" so that no pixels will be excited until the beam reaches its new starting position for the next row. (For purposes of this discussion, the phrase "horizontal scan interval" will be used to describe the period of time required for the beam to scan across all of the pixels in one row and then retrace to the beginning of the next row.) Likewise, after the beam has reached the last pixel of the last row, the beam quickly retraces to the left-most pixel in the top row so that the raster pattern may begin again. During this vertical retrace movement, the intensity of the beam is once again blanked to avoid affecting the displayed image.

By way of further background, it is an artifact of the evolution of display technology that a vertical retrace conventionally includes a wait time after the beam has snapped back to the top-left part of the display and before it resumes scanning across visible pixels. In older-technology display systems, this wait time was necessary in order for the analog circuits that move the beam to settle after the retrace. The length of this wait time is usually equal to the length of several horizontal scan intervals. For purposes of this discussion, the phrase "raster scan period" will be used to describe the period of time required for the beam to scan across all of the pixels in the entire display and then retrace to the beginning of the next row, including the just-described wait time.

While it is possible to change pixel data in the frame buffer memory at any time during a raster scan period, it is known that changing frame buffer data in the middle of a scan period may result in undesirable visual effects such as noise or tearing appearing in the image being displayed.

One method that has been used to solve this problem has been to write to the frame buffer memory only during the vertical retrace interval. While the latter technique does avoid the introduction of artifacts into the displayed image, it requires that all writes to the frame buffer must wait until vertical blank to be executed. Thus, when this technique is employed, the average wait time for all such writes will be one half of the length of one raster scan period. This wait time represents a compromise of speed in return for enhanced picture quality.

A second method that has been used to solve this problem in the past has been to use first and second frame buffer memories. This second technique of using first and second frame buffer memories is known as double buffering. In higher-end double-buffered systems, pixel data in the first frame buffer (the "viewable" or "front" buffer) is displayed while an image is rendered into the second frame buffer (the "non-viewable" or "back" frame buffer). Once the image has been completely rendered into the second frame buffer, the buffers are "swapped" so that the second frame buffer becomes the viewable buffer and the first frame buffer becomes the non-viewable frame buffer. A new frame is then rendered into the first buffer, and the buffers are swapped again. Such a solution provides the advantage that writes to the non-viewable frame buffer may occur at any time. However, the system must still wait until vertical blank occurs before the buffers are swapped. Moreover, such a system is more expensive to implement because of the cost of the redundant frame buffer memory and the overhead associated with swapping the two frame buffers.

In lower-end double-buffered systems, the buffers are never swapped; rather, one buffer is always viewable, and the other is always non-viewable. The pixel data in the non-viewable buffer is simply copied into the viewable buffer once a frame has been completely rendered. To make the transfer efficiently, use is generally made of a block transfer engine or "BLT engine." While such lower-end double-buffered systems are less expensive to implement than true buffer-swapping systems, they also suffer from the previously-describe drawback that BLT operations may only occur during vertical refresh if visual defects are to be avoided.

It is therefore an object of the present invention to reduce the average wait time required to perform frame buffer BLT operations in computer graphics display systems.

It is a further object of the present invention to perform such reduced-wait-time frame buffer BLT operations without introducing unwanted visual artifacts into the displayed image.

SUMMARY OF THE INVENTION

These and other objects are achieved with a method and apparatus for transferring a block of pixel data from a source multi-line frame buffer area to a destination multi-line frame buffer area in a raster-type computer graphics display system. In a preferred embodiment, the method steps are performed by a state machine embedded in a macro function unit within a computer graphics subsystem. According to the method, it is first determined whether the first raster line corresponding to the destination multi-line frame buffer area is at least a minimum number of raster lines ahead of the current raster line. If so, the method and state machine follow a fast path, during which the pixel data are transferred one line at a time from the source multi-line frame buffer area to the destination multi-line frame buffer area until the last line of pixel data in the block has been transferred. Then, the transfer operation stops. On the other hand, if it is determined that the first raster line in the destination multi-line frame buffer area is not a minimum number of lines ahead of the raster, then the method and state machine follow a slow path. In the slow path, the state machine times the line-by-line transfers of pixel data so as intentionally to remain behind the raster throughout the transfer operation: The state machine checks before each line is transferred to make certain that the destination line is behind the raster. After each line is written, however, the state machine also checks to see whether the next destination line is ahead of the raster; this may occur if a vertical retrace has just begun. If so, the slow path procedure is interrupted, and the state machine switches to the fast path for the remainder of the transfer operation.

BRIEF DESCRIPTION OF THE DRAWINGS

The invention is described herein with reference to the following drawings.

DETAILED DESCRIPTION OF THE PREFERRED EMBODIMENTS

Figure 1:
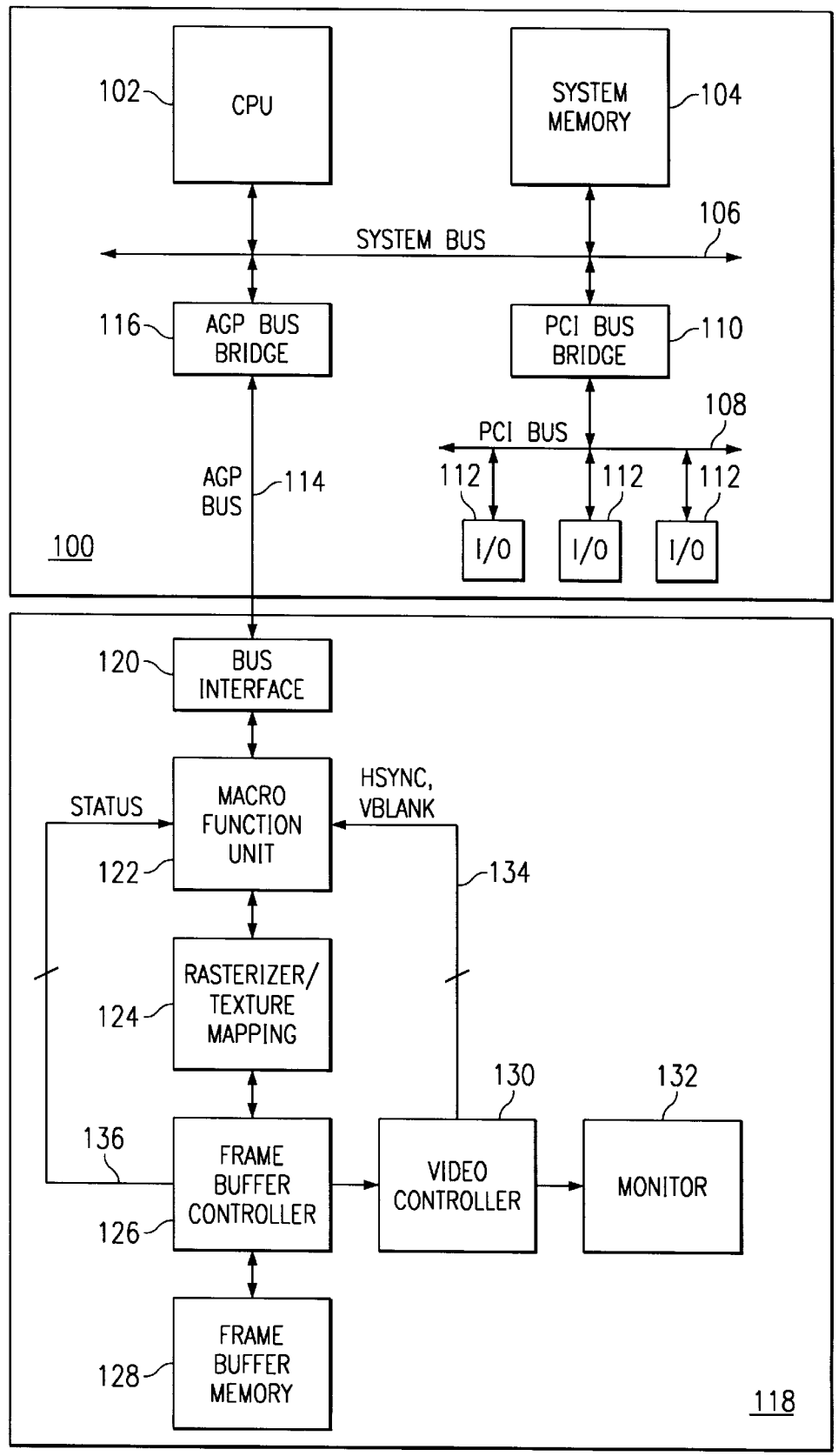
FIG. 1 is a block diagram of a computer system having a preferred embodiment of the invention implemented therein.

FIG. 1 is a block diagram of a computer system having a preferred embodiment of the invention implemented in its graphics subsystem. Computer system 100 may be conventional, and the specific elements illustrated within computer system 100 are given by way of example only. Those having ordinary skill in the art will appreciate that the invention is suitable for implementation not only in computer systems like the one illustrated herein, but also in computer systems having other bus types and bus architectures. CPU 102 and system memory 104 are coupled to a system bus 106. Several I/O devices 112 are coupled to PCI bus 108, which in turn is coupled to system bus 106 via PCI bus bridge 110. Graphics subsystem 118 is coupled to AGP bus 114 via bus interface 120. In turn, AGP bus 114 is coupled to system bus 106 via AGP bus bridge 116.

The graphics pipeline within graphics subsystem 118 includes macro function unit 122, rasterizer/texture mapping subsystem 124, frame buffer controller 126 and frame buffer memory 128. Frame buffer controller 126 controls reads from and writes to frame buffer memory 128, and provides pixel data from frame buffer memory 128 to video controller 130. Video controller 130 may be conventional and is presumed to include a RAMDAC and circuitry to generate the necessary horizontal sync and vertical blank signals for driving monitor 132. These horizontal sync and vertical blank signals (hsync and vblank) are also provided to macro function unit 122 over wires 134. Frame buffer controller 126 provides status information to macro function unit 122 over wires 136. For example, frame buffer controller 126 may provide status signals to macro function unit 122 indicating whether the frame buffer controller is busy executing previously-issued graphics commands or whether it is available to execute a new graphics command.

It is presumed herein that frame buffer controller 126 has the capability to execute a one-line BLT operation either from one frame buffer memory to another or from one location to another location within the same frame buffer memory. Such a one-line BLT feature is known in the art and will not be described in further detail herein except to note that, typically, all that is required to execute a one-line BLT using such a feature is to specify the source X,Y starting address, the destination X,Y starting address, and the line length. Preferably, the registers and state machine necessary to implement the invention will be housed in macro function unit 122, and will make use of the features provided by frame buffer controller 126.

Figure 2:
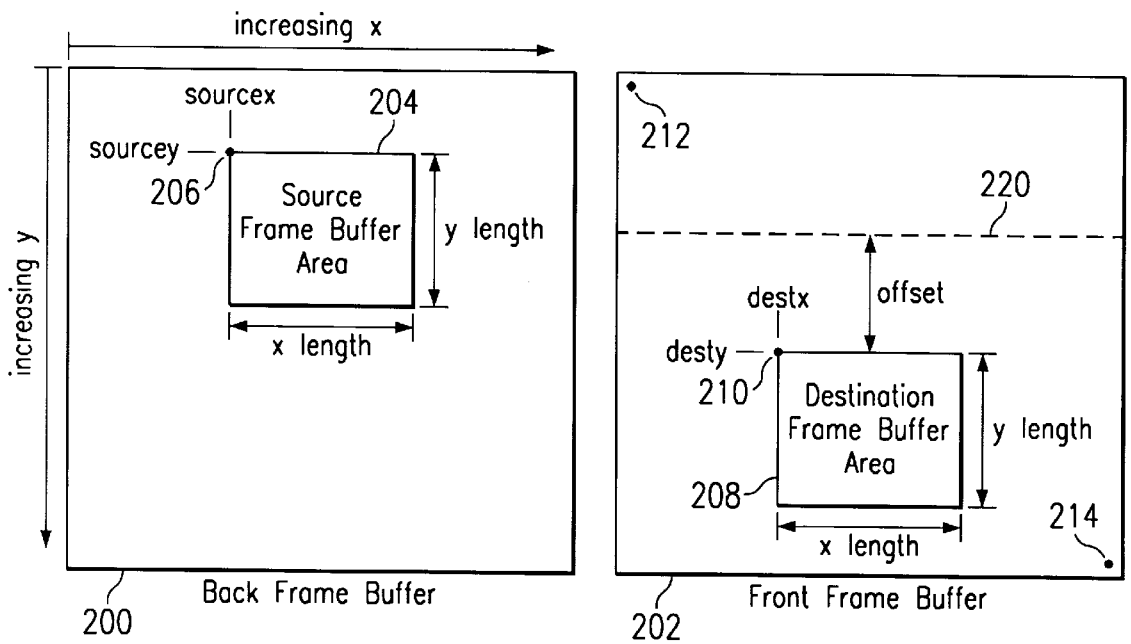
FIG. 2 is a diagram illustrating back and front frame buffer memories containing source and destination frame buffer areas, respectively.

FIG. 2 is a diagram showing a back (non-viewable) frame buffer memory 200 and a front (viewable) frame buffer memory 202. FIG. 2 is included herein as a visual aid in defining several terms that will be used in the discussion that follows. A source frame buffer area 204 is shown having an xlength and ylength as indicated, and having an upper-left-most pixel 206. By convention herein, pixel 206 will indicate the starting address of source frame buffer area 204. That starting address will be written herein as sourcex, sourcey, as shown. Similarly, a destination frame buffer area 208 is shown having an xlength and a ylength as indicated, and having an upper-left-most pixel 210. By convention herein, pixel 210 will indicate the starting address of destination frame buffer area 208. That starting address will be written herein as destx, desty, as shown. The location within frame buffer memory 202 that corresponds to the first viewable pixel in the raster pattern is indicated at 212. The location that corresponds to the last viewable pixel in the raster pattern is indicated at 214. Once the raster reaches the pixel corresponding to location 214, it snaps back to the upper-left-most portion of the display and resumes scanning after the previously-described wait time "vblank." The term "lines_in_vblank" refers to the number of horizontal scan intervals during vblank. For the sake of clarity: The total time required for an entire raster scan period would equal the time required for one horizontal scan interval multiplied by the quantity [lines_in_vblank +the number of lines between pixel 212 and pixel 214 inclusive]. Line 220 in the drawing indicates a y coordinate that is calculated as an offset from the starting location of destination frame buffer area 208. The purpose of this offset calculation will be further described below in the context of FIG. 4.

Figure 3:
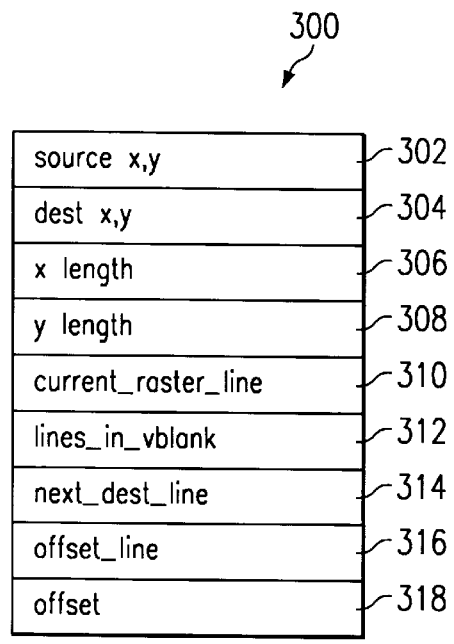
FIG. 3 is a block diagram illustrating a set of registers contained within the macro function unit of FIG. 1.

FIG. 3 is a block diagram illustrating a preferred set of registers 300 to be contained within macro function unit 122. Before requesting a frame buffer BLT operation, software should preset sourcex,y register 302 so that it points to pixel 206. Software should preset destx,y register 304 so that it points to pixel 210. Software should preset xlength register 306 and ylength register 308 to define the desired size of the block to be moved. (In a preferred embodiment, it was presumed that source frame buffer area 204 and destination frame buffer area 208 would always have the same size and dimensions.)

Current_raster_line register 310 is a counter value. Circuitry should be provided to keep the value in current_raster_line register 310 current at all times. The counter value should reset to zero at the beginning of vblank, and should increment once after each horizontal scan interval. Thus, by the time pixel 212 is displayed (corresponding to a frame buffer y coordinate of 0), the value in current_raster_line register 310 will equal lines_in_vblank. Because of this disparity, the state machine for implementing the method must know how many lines are in vblank. Lines_in_vblank register 312 is provided for this purpose. It should be preset by software prior to requesting a frame buffer BLT operation. Next_dest_line register 314 is also used as a counter. Its purpose is to facilitate determining whether the next line of pixel writes in the frame buffer BLT operation will correspond to a display line that is ahead of or behind the current raster position. The value in next_dest_line register 314 takes into account the disparity between frame buffer y coordinates and display line y coordinates (the difference being lines_in_vblank), as will be discussed below in the context of FIG. 4. The value in offset_line register 316 represents the position of line 220 using display line coordinates. It is calculated as the initial value of next_dest_line minus the value in offset register 318. In a preferred embodiment, the offset used was 10 lines. In other embodiments, other offsets may be used. The purpose of this offset will be further described in the context of FIG. 4.

Figure 4:
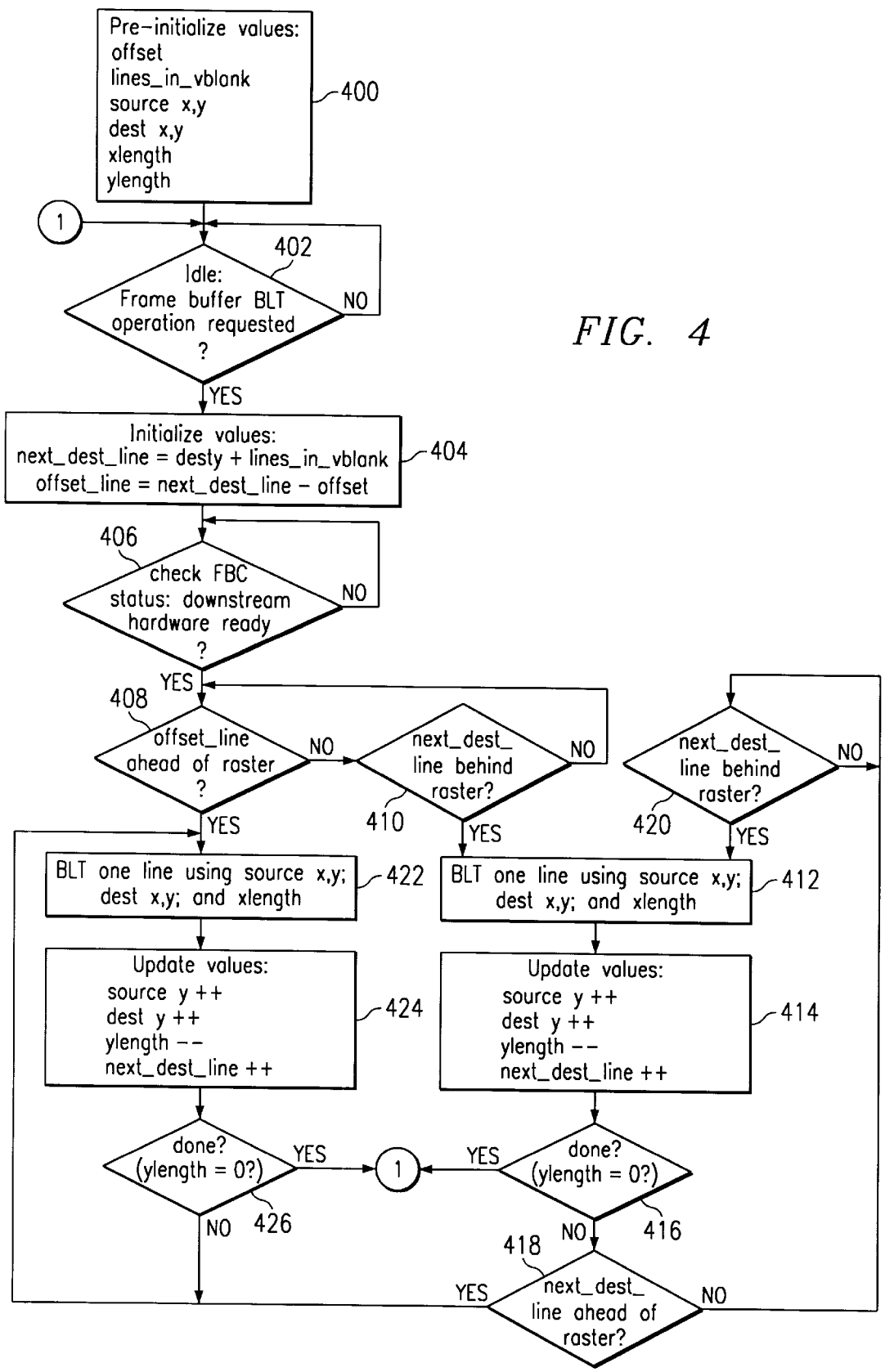
FIG. 4 is a flow diagram illustrating a method of transferring a block of pixel data from a source frame buffer area to a destination frame buffer area according to a preferred embodiment of the invention.

FIG. 4 is a flow diagram illustrating a method of transferring a block of pixel data from source frame buffer area 204 to destination frame buffer area 208 in accordance with the invention. In a preferred embodiment, a state machine was constructed within macro function unit 122 to implement the method steps shown in FIG. 4 using the values stored in registers 302–318. A person having ordinary skill in the art and having reference to this specification, especially FIG. 4 and the accompanying text, will be able to design such a state machine readily. The drawing presumes that, in step 400, software will preload appropriate values into offset register 318, lines_in_vblank register 312, sourcex,y register 302, destx,y register 304, xlength register 306 and ylength register 308 before requesting a frame buffer BLT operation. Note that the value in xlength register 306 may be equal to or less than the number of pixels in a display line. Once these values have been preset, software may request a frame buffer BLT operation. Step 402 in the drawing corresponds to the idle state in which the state machine waits for the frame buffer BLT operation to be requested. Once the operation is requested, the method continues to step 404, in which the remaining necessary values are initialized: The initial value of next_dest_line register 314 is set equal to desty+lines_in_vblank. The initial value of offset_line register 316 is set equal to next_dest_line−offset. In step 406, the state machine waits until frame buffer controller 126 indicates (via status lines 136) that it is ready to receive a command. Once this confirmation is received, the substance of the BLT operation begins.

In step 408, a determination is made whether offset_line 220 is ahead of the current raster position. This is done by determining whether the difference between offset_line register 316 and current_raster_line register 310 is positive, negative or zero. The reasoning behind the offset is that, if next_dest_line is at least a minimum number of lines ahead of the raster, then the BLT operation may be performed without the raster catching up, even under worst case conditions. Therefore, if it is determined in step 408 that offset_line 220 is ahead of the raster, then the BLT operation may be performed as fast as possible. The block may be transferred line-by-line without checking between each line transfer to determine the current raster position again. The latter mode of operation corresponds to steps 422–426 ("the fast path"). On the other hand, if it is determined in step 408 that offset_line 220 is not ahead of the raster, then using the fast path would result in a possibility either that the BLT operation could pass the raster, or that the raster could pass the BLT operation. Either event could tear the image. Therefore, if it is determined in step 408 that offset_line 220 is not ahead of the raster, then the method follows steps 410–420 ("the slow path").

If in the fast path, macro function unit 122 issues a one-line BLT command to frame buffer controller 126 during step 422 using the current values in sourcex,y register 302, destx,y register 304 and xlength register 306. After doing so, it updates the values in sourcex,y register 302 (y value only), destx,y register 304 (y value only), ylength register 308 and next_dest_line register 314 as shown in step 424. In step 426, it checks to see if the operation is complete by determining whether the value in ylength register 308 has decremented to zero. If so, the operation stops and the state machine returns to idle state 402; if not, the operation continues with step 422.

If in the slow path, the state machine will time the one-line BLTs so that they all occur behind the current raster position. Thus, during step 410, the state machine checks to see whether next_dest_line is behind the current raster line. It accomplishes this by comparing the value of next_dest_line register 314 with the value of current_raster_line register 310. If it is determined in step 410 that next_dest_line is behind the raster, then a one-line BLT command is issued in step 412. The appropriate values are then updated in step 414, just as they were in step 424. In step 416, the state machine checks to see if the operation is complete by determining whether ylength has decremented to zero. If so, the operation stops and the state machine returns to idle state 402. If not, the operation continues with step 418.

Importantly, in step 418, the state machine checks to see if next_dest_line is ahead of the current raster position. This may occur if a vertical retrace has just begun. If so, then next_dest_line will find itself a minimum of lines_in_vblank ahead of the current raster position, whereas just moments before it was behind the raster. In such a case, it would then be safe to finish the BLT operation using the fast path. Therefore, if the state machine determines in step 418 that next_dest_line is ahead of the raster, then the algorithm switches to the fast path (steps 422–426) for the remainder of the BLT operation. If, on the other hand, next_dest_line is not ahead of the raster, then the algorithm proceeds with step 420. In step 420, a determination is made once again whether next_dest_line is behind the raster. If so, then the operation continues with step 412 (another one-line BLT). If not, then the algorithm repeats step 418.

While the present invention has been described in detail in relation to a preferred embodiment thereof, it should be understood that the described embodiment has been presented by way of example only, and not by way of limitation. It will be understood by those skilled in the art that various changes may be made in the form and details of the illustrated embodiment without departing from the spirit and scope of the invention as defined by the appended claims and their equivalents. For example, although the illustrated embodiment contemplates block moves from one frame buffer memory to another, the invention may also be implement to move blocks from one location to another location quickly within the same frame buffer memory without causing unwanted artifacts in the displayed image.

What is claimed is:

1. A method of transferring a block of pixel data from a source multi-line frame buffer area to a destination multi-line frame buffer area in a raster-type computer graphics display system, said method comprising the steps of:

a) determining whether the first raster line corresponding to said destination multi-line frame buffer area is at least a minimum number of raster lines ahead of the current raster line; and if so, proceeding to step b); but if not, proceeding to step c);

b) transferring lines of pixel data one line at a time from said source multi-line frame buffer area to said destination multi-line frame buffer area until the last line of pixel data in said block of pixel data has been transferred, then stopping the transfer operation;

c) determining whether the first raster line corresponding to said destination multi-line frame buffer area is behind the current raster line; and if not, beginning step c) again; but if so, proceeding to step d);

d) transferring one line of pixel data from said source multi-line frame buffer area to said destination multi-line frame buffer area in accordance with a next source line indicator and a next destination line indicator;

e) if the line of pixel data transferred during step d) was the last line in said block of pixel data, stopping the transfer operation; otherwise, updating said next source line indicator and said next destination line indicator and proceeding to step f);

f) determining whether the raster line corresponding to said next destination line indicator is ahead of the current raster line; and if so, proceeding to step b); but if not, proceeding to step g);

g) determining whether the raster line corresponding to said next destination line indicator is behind the current raster position; and if not, beginning step g) again; but if so, proceeding to step d).

2. A method according to claim 1, wherein steps b) and d) comprise issuing a one-line BLT command to a BLT engine.

3. A method according to claim 1, wherein steps b) and d) are performed responsive to a source XY address, a destination XY address, and an X length that may be less than the X length of a full raster line.

4. A method according to claim 1, wherein said source multi-line frame buffer area is located in a first frame buffer memory and said destination multi-line frame buffer area is located in a second frame buffer memory.

5. A method according to claim 1, wherein said source multi-line frame buffer area and said destination multi-line frame buffer area correspond to first and second areas, respectively, within the same frame buffer memory.

* * * * *